United States Patent [19]

Jewell

[11] Patent Number: 4,767,196
[45] Date of Patent: Aug. 30, 1988

[54] ASYMMETRIC OPTICAL LOGIC ELEMENT

[75] Inventor: Jack L. Jewell, Bridgewater, N.J.

[73] Assignee: American Telephone and Telegraph Company, AT&T Bell Laboratories, Murray Hill, N.J.

[21] Appl. No.: 132,694

[22] Filed: Dec. 14, 1987

Related U.S. Application Data

[63] Continuation of Ser. No. 802,842, Nov. 27, 1985, abandoned.

[51] Int. Cl.$^4$ .......................... G02F 3/00; G02F 1/015
[52] U.S. Cl. ..................................... 350/354; 350/316
[58] Field of Search ................ 350/316, 354, 384–386, 350/393; 372/23; 356/352; 364/713; 370/1, 3

[56] References Cited

U.S. PATENT DOCUMENTS

| | | | |
|---|---|---|---|
| 3,630,595 | 12/1971 | Emmasingel | 350/385 |
| 3,792,916 | 2/1974 | Sarna | 350/316 |
| 4,615,034 | 9/1986 | Gunten et al. | 372/23 |
| 4,630,898 | 12/1986 | Jewell | 350/385 |

OTHER PUBLICATIONS

Orlov et al., "Possibility of Construction of an Arithmetic Unit Based on Controlled Optical Tranparencies", Sov. J. Quant. Electronics, vol. 4 #1, 7–1984, pp. 12–16.
Miyazaki et al., "Optical Multiplexer/Demultiplexers Using Thin-Film Optical Filters", Fujitsu Sci & Tech. J. (Japan), vol. 16 #4, 1980, pp. 17–36.
Applied Physics Letters, 42(2), 1/15/83, pp. 131–133, "Realization of an InSb Bistable Device as an Optical AND Gate and its Use to Measure Carrier Recombination Times", C. T. Seaton et al.
Applied Physics Letters, 45(1), 7/1/84, pp. 13–15, "Novel Hybrid Optically Bistable Switch: The Quantum Well Self–Electro–Optic Effect Device", D. A. B. Miller et al.
Applied Physics Letters, 44(2), 1/15/84, pp. 172–174, "Use of a Single Nonlinear Fabry–Perot Etalon as Optical Logic Gates", J. L. Jewell et al.
Applied Physics Letters, 34(8), Apr. 15, 1979, pp. 511–514, "Optical Modulation by Optical Tuning of a Cavity", H. M. Gibbs et al.

Primary Examiner—William H. Punter
Attorney, Agent, or Firm—Jack S. Cubert; Wilford L. Wisner

[57] ABSTRACT

A radiant energy logic element includes first and second reflecting devices and a radiant energy nonlinear medium between said first and second reflecting devices and in contact therewith. Radiant energy beams of first and second wavelengths are applied to the reflecting devices. The first reflecting device is transmissive at said second radiant energy beam wavelength and reflective at said first radiant energy beam wavelength, and said second reflecting device is reflective at said first and second radiant energy beam wavelengths. The nonlinear medium of the logic element is responsive to radiant energy beams applied to the first reflecting device but insensitive to radiant energy beams applied to the second reflecting device.

14 Claims, 2 Drawing Sheets

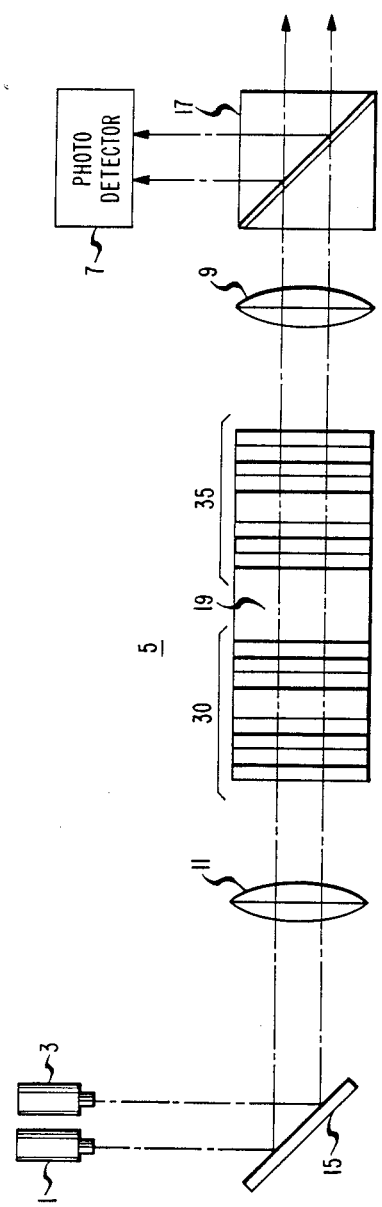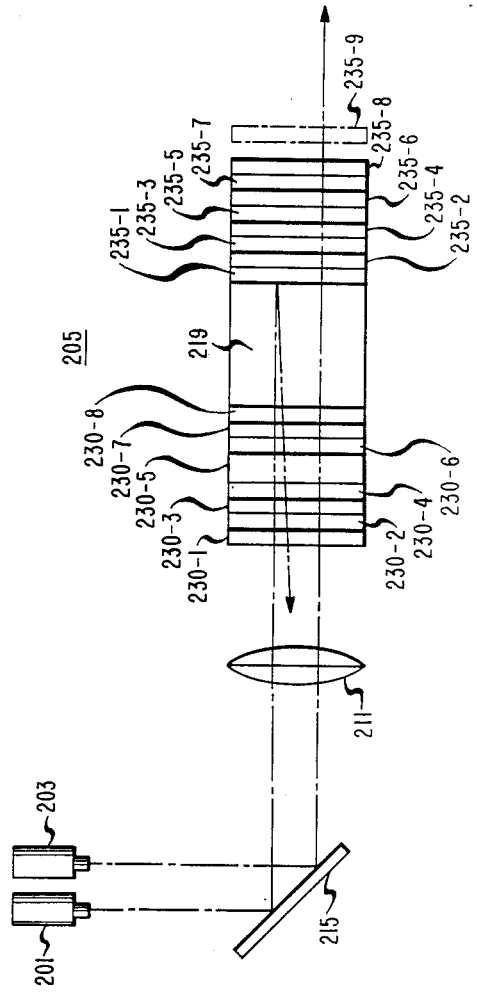

ASYMMETRIC OPTICAL LOGIC ELEMENT

This application is a continuation of application Ser. No. 802,842, filed Nov. 27, 1985, now abandoned.

TECHNICAL FIELD

This invention relates generally to the field of optical logic elements and particularly to groups of optical logic elements which are operated in series.

BACKGROUND OF THE INVENTION

There is a great deal of interest at the present time in optical logic elements not only because of their potential capability for performing fast logic operations but also because of the possibility they afford for construction of massively parallel computer architectures. It is contemplated that a single array of optical logic elements might contain at least $10^6$ logic gates which would function simultaneously. Several such arrays might be optically interconnected by a series of lenses thus permitting operation of more logic elements in a given time period than is presently contemplated for electronic logic elements.

Several types of optical logic elements have been developed. For example, highly nonlinear semiconductor materials such as InSb, InAs or GaAs may be used in optical bistable devices. See, for example, Applied Physics Letters, 42, pp. 131-133, Jan. 15, 1983. Use of such semiconductors in multiple quantum well (MQW) devices relying on absorption effects caused by excitons has also been demonstrated. One promising MQW device is termed the self-electro-optic effect device (SEED) and uses optically influenced electric fields to modulate the light beam. See, for example, Applied Physics Letters, 45, pp. 13-15, 1984. These elements may be termed single beam logic elements.

Yet another approach to optical logic elements uses a nonlinear Fabry-Perot etalon to form logic gates. See, for example, Applied Physics Letters, 44, pp. 172-174, Jan. 15, 1984. This technique uses, for example, two input beams and a probe beam with a nonlinear medium selected so that the absorption of a single input pulse changes the refractive index enough to shift the Fabry-Perot transmission peak near the probe beam wavelength by approximately one full width at half maximum. Of course, the peak returns to its initial wavelength after the medium relaxes. However, the probe transmission immediately after the input beams are incident on the etalon determines the output. Pulsed operation was also contemplated and even preferred. This type of logic element will be referred to as a dual beam device as the device distinguishes between two beams, in this case because they are at different wavelengths.

Similar work has described, for example, optical modulation by optical tuning of a Fabry-Perot cavity, but the potential for performing logic operations was not explicitly described. The transmission of a single beam through the cavity was modulated by a control beam which varied the refractive index of the cavity medium thereby changing the refractive index for the signal beam. See, for example, Applied Physics Letters, 34, pp. 511-514, Apr. 15, 1979.

Optical logic elements afford, at least theoretically, enormously enhanced switching capabilities as compared to electronic logic elements. Many optical logic elements, however, are subject to limitations that are not common in electronic logic elements. One such limitation relates to directionality. Optical elements accept light beam inputs from directions other than the preferred input side. Consequently, extraneous light beams may be accepted as inputs. As a result, the device operation is impaired. While lack of directionality is not objectionable in small arrays of widely spaced logic elements, closely packed logic elements in large arrays gives rise to extraneous beams that are inadvertently applied in a direction reverse to the information flow. As a result, false operation or a lowering of the noise immunity of the logic elements may be experienced. It is an object of the invention to provide improved optical logic elements which are asymmetric whereby data flow is optimized in one direction and inhibited in the reverse direction.

SUMMARY OF THE INVENTION

The invention is directed to an optical logic element having an optical nonlinear medium between and in contact with first and second reflecting devices. A probe beam and at least one input beam are incident on said element. The first reflecting device is transmissive to the input beam wavelength and reflective to the probe beam wavelength while the second reflecting device is reflective to both the input beam and probe beam wavelengths whereby the nonlinear medium is responsive to beams applied to the first reflecting device but insensitive to beams applied to the second reflecting device.

According to one aspect of the invention, each of the first and second reflecting devices includes alternating layers of high and low refractive index materials. One of the high refraction index layers of the first reflecting device is of greater thickness than the other first reflecting device layers whereby the first reflecting device is substantially transparent to an input beam incident thereon, but the second reflecting device is substantially reflective to an input beam applied thereto.

According to another aspect of the invention, the first reflecting device comprises a series of alternating layers of high refractive index material and low refractive index material in the region of the wavelength of said one beam. One layer of the high refractive index material is an integral multiple of one-half the input beam wavelength, and the other layers are one-quarter the input light beam wavelength. The second reflecting device comprises a series of alternating layers of high refractive index material and low refractive index of one-quarter the input beam wavelength whereby said input light beam readily passes through the first reflecting device to the nonlinear medium in a first direction, but the input light beam incident on the second reflecting device is substantially attenuated from passing therethrough to the nonlinear medium.

BRIEF DESCRIPTION OF THE DRAWING

FIG. 1 is a schematic representation of a prior art multiple beam optical logic element;

FIG. 2 is a schematic representation of a multiple beam optical logic element illustrative of the invention.

Figure 3:
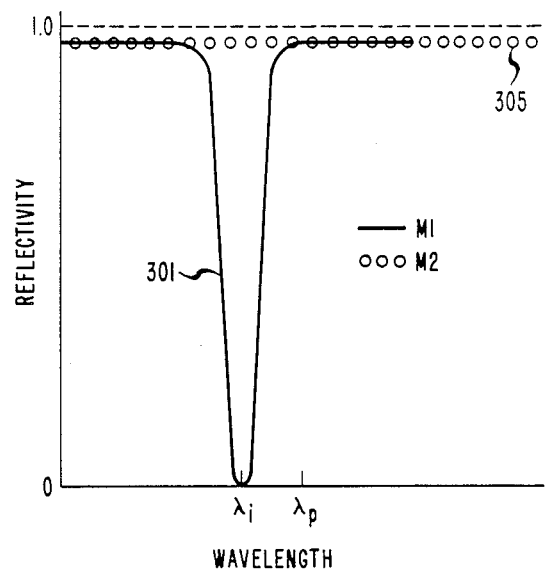
FIG. 3 shows waveforms illustrating the reflecting properties of portions of the optical logic element according to the invention.

For reasons of clarity, the components depicted are not drawn to scale.

DETAILED DESCRIPTION

The invention will be particularly described by reference to a particular embodiment. Other embodiments and variations will be readily thought of by those skilled in the art.

FIG. 1 is a schematic representation of an exemplary embodiment of a multiple beam optical logic element according to the prior art. Depicted are probe beam source 1, at least one input beam source 3, a nonlinear element 5, and means 7 for detecting the output from the nonlinear element. Means 7 may be a photodetector. Also depicted is lense 11 which focuses the input and probe beams, respectively, onto the nonlinear element. The probe and input beams are directed to the nonlinear element by mirror 15. The probe beam is directed to the means for detecting by lens 9 and beam splitter 17. Sources 1 and 3 include means for varying the intensities of the beams. The nonlinear element includes a nonlinear medium indicated as 19.

The input and probe means desirably have different wavelengths, i.e., the logic element is a dual beam device. It is generally desirable, because of typical semiconductor absorption characteristics, to have a probe beam wavelength which is longer than the input beam wavelength. This facilitates some logic operations, such as NOR, as probe beam absorption is minimized. It is also desirable, when operating in a pulsed mode, to have the probe beam follow the input beam as this enables the maximum effect on the probe beam by the input beam.

In FIG. 1, the nonlinear element is a transmission nonlinear Fabry-Perot etalon using a multiple quantum well (MQW) structure grown by, for example, molecular beam epitaxy as the nonlinear medium. The MQW structure nominally contained 63 periods of 76 Angstrom thick GaAs and 81 Angstrom thick $Al_{0.37}Ga_{0.63}As$ layers which were clad by $Al_{0.37}Ga_{0.63}As$ layers for a total thickness of approximately 1.25 $\mu M$. The etalon mirrors were ten-layer dielectric interference filters with a four-wave thick spacer. The filters were designed for high transmission at a peak output wavelength of a mode locked laser emitting at 825 nm and had 97 percent or greater reflectivity for wavelengths greater than 850 nm. This type of mirror is desirable because it permits high finesse at the probe wavelength and also makes efficient use of input pulses at wavelengths close to the probe wavelengths.

The probe was an 850 nm 10 mW beam from a CW dye laser, and 7 ps input pulses were the output of a synchronously pumped mode locked dye laser having peak output at 825 nm and equipped with a cavity dumper. The probe may be operated in a pulsed mode. The CW mode of operation was selected to more clearly show the relaxation characteristics. It was also possible to adjust the energy of the input pulses. The gate can use a relatively high energy probe pulse which is controlled with a weak input pulse, i.e., its transmission characteristics through the Fabry-Perot cavity are determined by the input pulse.

This is better understood from the following considerations. The nonlinear element when used as a NOR gate is highly absorbent at the input beam wavelength, but approximately transparent, in the absence of an input beam, to the probe beam although some of the probe energy is absorbed. The nonlinear medium within the nonlinear element can be transparent and the element not transparent due to tuning of the cavity. The changes in the probe absorption are nominally due only to changes in the etalon tuning and not to any change in absorptivity at the probe wavelength. If there is no input beam, transmission and absorption of the probe beam are both maximized. However, if one or more input beams are present, the probe beam is primarily reflected. This is because absorption of the input beam by the nonlinear medium changes its refractive index at the probe wavelength, and thus, the optical length of the cavity seen by the probe varies. Because the probe beam has a much higher energy than does the input beam, the small fractional absorption of the probe beam in the nonlinear medium or in the mirrors may result in as much energy absorption as occurs with one input beam. Then for zero and one input levels, the absorbed energies are approximately equal and temperature stability is obtained although the operating temperature may be above the ambient temperature.

Variations will be readily thought of. For example, the nonlinear medium might be a bulk semiconductor material rather than an MQW structure. The latter type of structure appears preferred at the present time because of the strong nonlinear effects caused at room temperature by excitons. A reflecting Fabry-Perot etalon, i.e., one with a totally reflecting back mirror, might also be used. Exemplary semiconductor materials include GaAs, InP, and CdS.

It is also contemplated that there may be more than one input beam. It should be noted that this analysis is an approximation which relies on the assumption that the pulses are long compared to the cavity buildup time. The analysis is invalid if probe absorption does not cause the same physical effect as absorption of the input. It is, however, generally a valid approximation.

The logic elements are most expediently operated as negative logic gates, for example, NOR or NAND, as these gates minimize the differences in energy absorption. The NOR gate appears preferred.

In the self-limited NOR gate, any pulse-to-pulse noise from the probe source is reduced by a factor which is approximately equal to the contrast. Thus, the self-limited gate is much more noise tolerant than is a non-self-limited gate. It should also be noted that the input and probe beams do not have to enter the nonlinear element from the same side of the cavity. They may enter from opposite sides. Thus, the data flow through a series of optical logic elements may be in a preferred direction but extraneous input beams applied in the reverse direction intefere with the proper operation of the logic elements.

Both the input and the probe beams may be operated either pulsed or CW. However, both beams should have the same temporal characteristics. The term "CW" means that the intensity is constant, or essentially constant, for a time longer than the device response time or for a clock period. "Pulsed" means for a time shorter than the medium relaxation time which must be less than the device clock period.

FIG. 2 is a schematic representation of a multiple beam optical logic element which according to the invention is asymmetric. Input beam source 201 directs a radiant energy, e.g. light beam, of wavelength $\lambda i$ (e.g., 825 nm) to reflecting device 230 via mirror 215 and lens 211 while beam source 203 projects a beam of wavelength λp (e.g., 850 nm) to the left side of reflecting device 230 via mirror 215 and lens 211.

Reflecting device 230 in accordance with the invention comprises layers 230-1 through 230-8 arranged to pass a small portion of the probe beam from source 203 to nonlinear medium 219 and substantially all of the input beam from source 201. Layers 230-1, 230-3, 230-5 and 230-7 are constructed of high refractive index material such as zinc sulfide and layers 230-2, 230-4, 230-6 and 230-8 are constructed of a low refractive index material such as magnesium fluoride each in contact with the adjacent high index layers, or nonlinear medium 219 in the case of layer 230-8. All of these layers except high refractive index layer 230-5 are of quarter wavelength width or integral multiples thereof for the input beam wavelength λi. Layer 230-5 is an integral number of half wavelengths in width whereby it provides much higher efficiency in passing the input beam through device 230 to nonlinear medium 219.

Device 235 comprises layers 235-1 through 235-8 or 235-9 as the case may be. Layers 235-1, 235-3, 235-5, and 235-7 are made of a low refractive index material (e.g., MgF). The remaining layers except 235-9 are made of a high refractive index material (e.g., ZnS). All of the layers are quarter wavelength or integral multiples of quarter wavelengths at the input beam frequency. In the absence of a multiple half wavelength layer (e.g., layer 235-9) such as layer 230-5 in device 230, substantially all beams impinging on layer 235-8 are reflected with high efficiency so that the input beam intensity at the right side of nonlinear medium 219 from this direction is very low. FIG. 3 shows waveforms illustrating the reflectivity of devices 230 and 235 as a function of wavelength. Waveform 301 is the reflectivity of device 230 (designated M1 in FIG. 3) which has a pronounced dip in reflectivity at the input light beam wavelength λi and is high elsewhere. Waveform 305 illustrates the reflectivity of device 235 (designated as M2 in FIG. 3) which is high at all wavelengths of interest.

The degree of asymmetry in the etalon can be expressed as the ratio of absorbed light from an input coming from the input side through device 230 to that coming from the output side through device 235. If reflecting devices 230 and 235 have no absorption and have reflectivities $R_1$ and $R_2$ respectively at the input wavelength, and $\alpha L$ is the absorptivity-times-length product of the nonlinear medium (at the input wavelength), then the degree of asymmetry A can be found from standard Fabry-Perot etalon formulae:

$$A = \frac{(1 + R_2 e^{-\alpha L})(1 - R_1)}{(1 + R_1 e^{-\alpha L})(1 - R_2)}$$

It is seen that A always increases when $R_2$ is increased or when $R_1$ is decreased. For $R_2 = 1.0$, A approaches infinity as expected. For $\alpha L \geq 0.5$, $R_1 = 0$ provides a desired arrangement because a double-pass through the medium is sufficient to absorb most of the input. When $\alpha L << 1$, it is desirable to have $R_1$ large enough such that the medium has efficient input absorption when the etalon thickness is in resonance with the input wavelength. In this case $R_1 \approx 1 - 2\alpha L$ is a good choice. In all cases we want $R_2$ to be as large as possible within engineering constraints since that always insures a large asymmetry A. It is preferred that reflecting devices 230 and 235 be as nearly equally reflecting as possible at the probe beam wavelength in order to maximize transmission of the probe beam when it is in resonance with the etalon. Such equalization may be effected by including a thicker layer 235-9 in mirror device 235. The thickness of this layer should provide a reflection characteristic curve that is a mirror image of the characteristic for mirror device 230 and is symmetric about the probe wavelength. The minimum point of such a reflection characteristic should occur at a wavelength that is greater than the input beam wavelength by twice the difference between the probe wavelength and the input beam wavelength.

In operation, an input applied to mirror 230 from input beam source 201 is transmitted by mirror 230, passes through nonlinear medium (NLM) 219 while being absorbed therein, and is then reflected by mirror 235 to make another pass through NLM. The remainder of the input beam is transmitted through mirror 230 again. This double-pass through NLM 219 increases the efficiency of absorption of the input compared to the case where both mirrors 230 and 235 transmit the input. The logic element 205 is thereby made highly insensitive to input light incident on layer 235-8 (or 235-9) since it is reflected before it reaches the nonlinear medium. Thus data can only flow from left to right in the device of FIG. 3.

Figure 4:
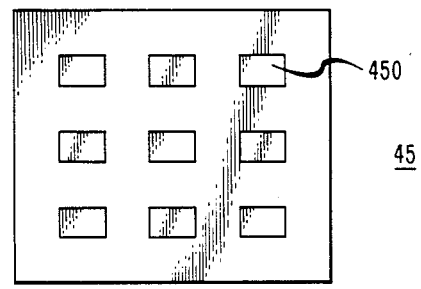
FIG. 4 is a schematic representation of an array of optical logic elements according to the invention.

FIG. 4 is a schematic representation of an array of optical logic elements according to this invention. As depicted, the array indicated as 45, comprises a plurality of optical logic elements, each of which is indicated as 450. The optical logic elements are not depicted in detail as they have already been represented in detail in FIG. 2. As depicted, the elements form a planar array.

Figure 5:
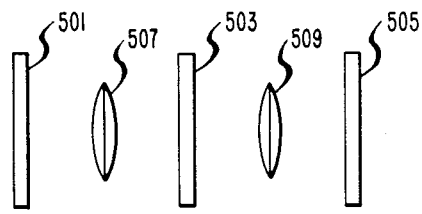
FIG. 5 is a schematic representation of cascaded arrays of optical logic elements according to the invention.

It is also contemplated that arrays of optical logic elements according to this invention may be cascaded, that is, they may be optically interconnected by lenses. One such cascaded array is depicted in FIG. 5 and comprises a plurality of arrays 501, 503 and 505 such as depicted in FIG. 4, optically interconnected by a plurality of lenses 507 and 509. In accordance with the invention, the beams may propagate through the arrays only in the direction determined by the asymmetry of the logic elements. Beams applied from the left side of an array are used by the optical logic devices therein. The optical logic elements, however, are insensitive to the beams applied from the right side thereof due to the difference in construction of the reflecting devices of the logic elements. The nonlinear element in the second array will function as the means for detecting the output from the first array, etc. Selection and use of lenses having the necessary characteristics will be readily done by those skilled in the art.

In one embodiment, the roles of the probe and input beams are interchanged in successive arrays. That is, the probe beam in one array becomes the input beam of the following array. Selection of the nonlinear medium is somewhat more critical as the probe beam for the, for example, second array may be more highly absorbed than was the probe beam for the first array. Exemplary materials include GaAs and InP, as well as their related compounds, and CdS. The latter material is presently useful only at liquid helium temperatures.

What is claimed is:

1. An asymmetric radiant energy logic element comprising:
   first and second reflecting devices;
   a radiant energy nonlinear medium between and in contact with said first and second reflecting devices;

means for applying a radiant energy beam of a first wavelength to said reflecting devices;

means for applying at least one radiant energy beam of a second wavelength to said reflecting devices;

said first reflecting device being transmissive at said second radiant energy beam wavelength and reflective at said first radiant energy beam wavelength and said second reflecting device being reflective at said first and second radiant energy beam wavelengths.

2. A radiant energy logic element according to claim 1 wherein:

each of said first and second reflecting devices comprises alternating layers of high and low refractive index materials;

the alternating layers of said first reflecting device including a plurality of layers of uniform thickness and at least one high refractive index layer of greater than said uniform thickness and the alternating layers of said second reflecting device including a plurality of layers of uniform thickness whereby the first reflecting device is substantially transparent to a second wavelength radiant energy beam applied thereto while the second reflecting device is substantially reflecting to a second wavelength radiant energy beam applied thereto.

3. A radiant energy logic element according to claim 2 wherein:

said alternating layers of uniform thickness are odd integral multiples of one-quarter said second wavelength thick and said high refractive index layer of greater thickness is an integral multiple of one-half the second wavelength thick.

4. A radiant energy logic device according to claim 3 wherein said second reflecting device further includes at least one high refractive index layer of thickness corresponding to an integral multiple of a half-wavelength of a wavelength displaced from said second radiant energy beam wavelength by twice the difference between the first and second wavelengths to make said first and second reflecting devices equally reflective at said first radiant energy beam wavelength.

5. A radiant energy logic element according to claim 2, 3 or 4 wherein said high refractive index layers are zinc sulfide layers and said low refractive index layers are magnesium fluoride layers.

6. A radiant energy logic element according to claim 5 wherein said first and second radiant energy beams are light beams.

7. A radiant energy logic element according to claim 2 wherein said first reflecting device includes one high refractive index layer of an integral multiple of one-half the second wavelength thickness and a plurality of layers one-quarter said second radiant energy beam wavelength and said second reflecting device includes a plurality of layers one-quarter said second radiant energy beam wavelength.

8. A radiant energy logic element according to claim 7 wherein: wherein said high refractive index layers are zinc fluoride layers and said low refractive index layers are magnesium fluoride layers.

9. A radiant energy logic element according to claim 8 wherein said first and second radiant energy wavelengths are optical wavelengths.

10. An asymmetric optical logic element comprising:

first and second mirror means;

a nonlinear medium between said first and second mirror means;

means for applying a first wavelength light beam to said first mirror means;

means for applying a second wavelength light beam to said first mirror means;

said first mirror means being transmissive at said second light beam wavelength and reflective at said first light beam wavelength and said second mirror means being reflective at said first and second light beam wavelengths whereby said nonlinear medium is responsive only to first and second wavelength light beams applied to said first mirror means.

11. An optical logic element according to claim 10 wherein:

each of said first and second mirror means comprises alternating layers of high and low refractive index materials;

the alternating layers of said first mirror means including a plurality of layers of uniform thickness and at least one high refractive index layer of greater than said uniform thickness and the alternating layers of said second reflecting device including a plurality of layers of uniform thickness whereby the first mirror means is substantially transparent to a second wavelength light beam applied thereto while the second mirror means is substantially reflective to a second wavelength light beam applied thereto.

12. An optical logic element according to claim 11 wherein:

said alternating layers of uniform thickness are odd integral multiples of one-quarter said second wavelength thick and said high refractive index layer of greater thickness is an integral multiple of one half the second wavelength thick.

13. An optical logic device according to claim 12 wherein said second mirror means further includes at least one high refractive index layer of thickness corresponding to an integral multiple of a half-wavelength of a wavelength displaced from said second optical beam wavelength by twice the difference between the first and second wavelengths to make said first and second mirror means equally reflective at said first light beam wavelength.

14. An optical logic element according to claim 11, 12, or 13 wherein said high refractive index layers are zinc sulfide layers and said low refractive index layers are magnesium fluoride layers.

* * * * *